Jan. 6, 1953  B. CHANCE  2,624,877
COURSE INDICATING SYSTEM
Filed March 26, 1946  3 Sheets-Sheet 1

INVENTOR.
BRITTON CHANCE
BY
William D. Hall
ATTORNEY

Jan. 6, 1953 B. CHANCE 2,624,877
COURSE INDICATING SYSTEM
Filed March 26, 1946 3 Sheets-Sheet 2

INVENTOR.
BRITTON CHANCE
BY
William D. Hall,
ATTORNEY

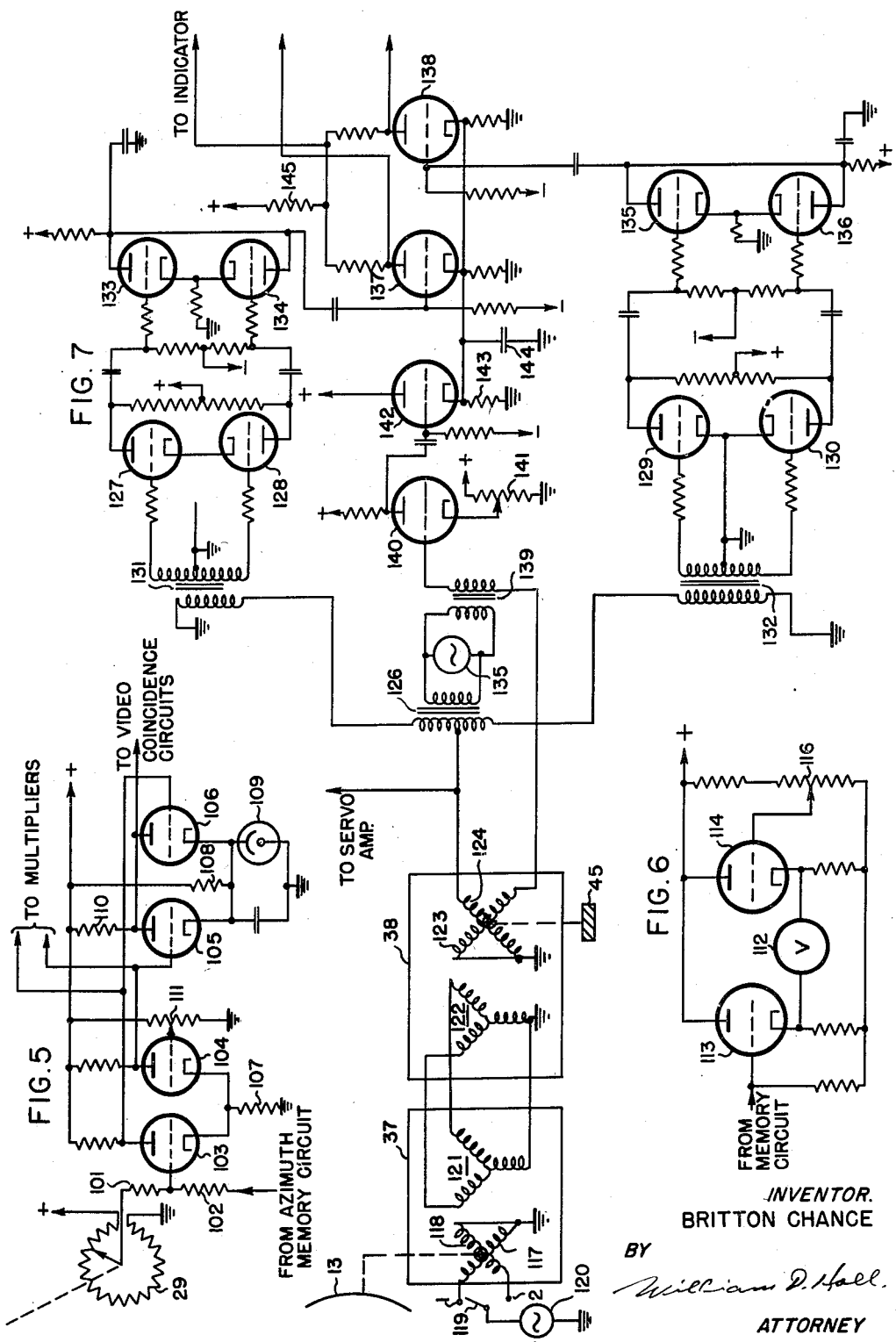

Patented Jan. 6, 1953

2,624,877

UNITED STATES PATENT OFFICE 2,624,877

COURSE INDICATING SYSTEM

Britton Chance, Cambridge, Mass., assignor, by mesne assignments, to the United States of America as represented by the Secretary of War Application March 26, 1946, Serial No. 657,145

7 Claims. (Cl. 343—112)

This invention relates generally to electrical apparatus and more particularly to an apparatus for providing the pilot of an aircraft with information enabling him to fly a specified course to a predetermined destination.

It is frequently desirable to determine the position of a moving aircraft wtih respect to a chosen ground target for the purpose of dropping bombs or other missiles thereon. One system devised for this purpose utilizes radio pulses from two beacon transmitters of known locations to determine the position of the aircraft and the time at which the aircraft has reached a previously chosen bomb-release point. More specifically, a directive beam of radio pulses is transmitted from the aircraft, and this beam is rotated in azimuth in such a manner that it periodically searches the ground area in the vicinity of the aircraft. When one of these radio pulses encounters one of the beacons, this beacon transmits a reply pulse which is received by the system in the aircraft and utilized to produce on the screen of a cathode ray tube or similar device an indication of the azimuth and range of the beacon relative to the aircraft. The distance of the bomb-release point from each of the two beacons is determined beforehand, and by flying a circular course maintaining continually the determined distance from the first beacon, the aircraft will reach the release point when the determined distance from the second beacon has been attained.

One common type of indicator is a plan position indicator (P. P. I.), in which the electron beam of the cathode ray tube is swept radially from the center of the tube face to the periphery, and this sweep is rotated about a central point in synchronism with the rotation of the directive antenna of the system. Pulses returned from reflecting objects or from beacon transmitters cause momentary intensification of the electron beam. Thus a plane representation of the ground area surrounding the aircraft is produced on the indicator screen, with the signals from beacons and reflecting objects in their approximate relative positions with respect to the aircraft, the position of which is represented by the center of the circular screen.

For the aircraft to follow a circular course about the first beacon, it is necessary to provide some means of comparing the actual position of this beacon as portrayed on the indicator screen with the desired position which the beacon would have relative to the aircraft if the latter were following the prescribed course. When the aircraft is on course, the ground track, or the direction of travel relative to the ground, will continually be perpendicular to the radius of its circular path, and its range from the first beacon will remain continually equal to the predetermined value. A line passing through the aircraft and perpendicular to its path should thus intersect the beacon located at the center of the circle.

Radio means have been devised for determining the direction of travel of an aircraft relative to the ground. This direction of travel is usually not the same as the heading of the aircraft due to the action of the wind in deflecting it from its path. The angle between the heading of the aircraft and its ground track is known as drift angle. If two ground points are chosen at different angular directions relative to the ground track of an aircraft, it can be shown geometrically that the aircraft approaches these points at different rates. Further, for a given position of the aircraft, if these points are separated by a predetermined difference in angular direction, the difference in the respective velocities of approach to these points varies directly as the mean angular displacement of these points from the direction of the ground track.

Due to the finite width of the directive beam of the antenna, an echo pulse received at a given instant may be a combination of a large number of echo signals from points at equal ranges but at slightly different azimuths. The phase of the radio-frequency oscillations making up each of these signals, varies at a rate dependent upon the velocity of the aircraft relative to the point returning the echo. Since these velocities are not equal, as stated above, the phase variation occurs at a different rate for each of these points, and hence a resulting amplitude modulation of the echo pulses is produced. The frequency of this modulation varies directly as the difference in respective velocities of approach and therefore varies directly as the angular displacement of the direction of the antenna beam from the ground track of the aircraft. By an observation of this modulation frequency, which is low enough to be observed visually, the direction of the ground track of the aircraft may be determined, and the drift angle may be measured. For a more detailed explanation of this method of determining drift angle and ground track, reference may be had to the copending application by Rubby Sherr, Serial No. 624,907, filed October 26, 1945.

Once the ground track of the aircraft has been determined some means is necessary to indicate to the pilot the angular divergence of the direction of the ground track from the desired direction perpendicular to the radius of the circular course. This means may be called a pilot's direction indicator or P. D. I. It is also necessary to provide information as to the difference between the actual and the desired range of the first beacon from the aircraft.

It is therefore an object of the present invention to provide a direction-indicating device which will enable a pilot to direct an aircraft upon a circular course of a predetermined radius around a fixed ground point which is a source of transmitted or reflected radio pulses. It is a more specific object to provide means for indicating to the pilot the angular divergence of the ground track of the aircraft from the desired position perpendicular to the radius of the circular course. It is a further object to provide means for indicating to the pilot the difference between the actual and desired range of the fixed ground point from the aircraft. It is still another object to render the operation of these indicating means automatic after certain initial data have been supplied to the indicating system.

Other objects, features and advantages of this invention will suggest themselves to those skilled in the art and will become apparent from the following description of the invention taken in connection with the following drawing in which:

Fig. 5 is a schematic diagram of an azimuth potentiometer and azimuth gate generator;

Fig. 6 is a schematic diagram of a type of range displacement or course change indicator which may be utilized in the present embodiment of the invention; and Fig. 7 is a schematic diagram of a portion of an antenna drive servo and an azimuth mark generator of a type which may form a part of the present embodiment of the invention.

Figure 1:
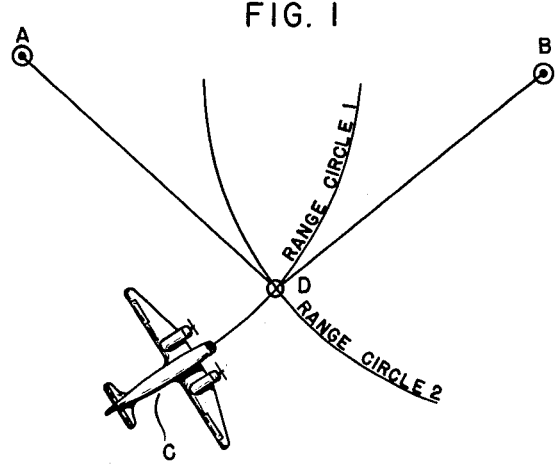
Fig. 1 is a diagram illustrating the method of navigation described above.

Reference is now made more particularly to Fig. 1 for a description of the method of navigation for which this invention is intended to be used. A and B represent the radio responder beacons located on the ground, and D represents the destination to be reached, e. g., a bomb release point. Range circle 1 represents the course followed by the aircraft C and is a circle having beacon A, hereinafter referred to as the target beacon or target, as a center and passing through destination D. Range circle 2 is a circle passing through destination D and having beacon B as a center.

Figure 2:
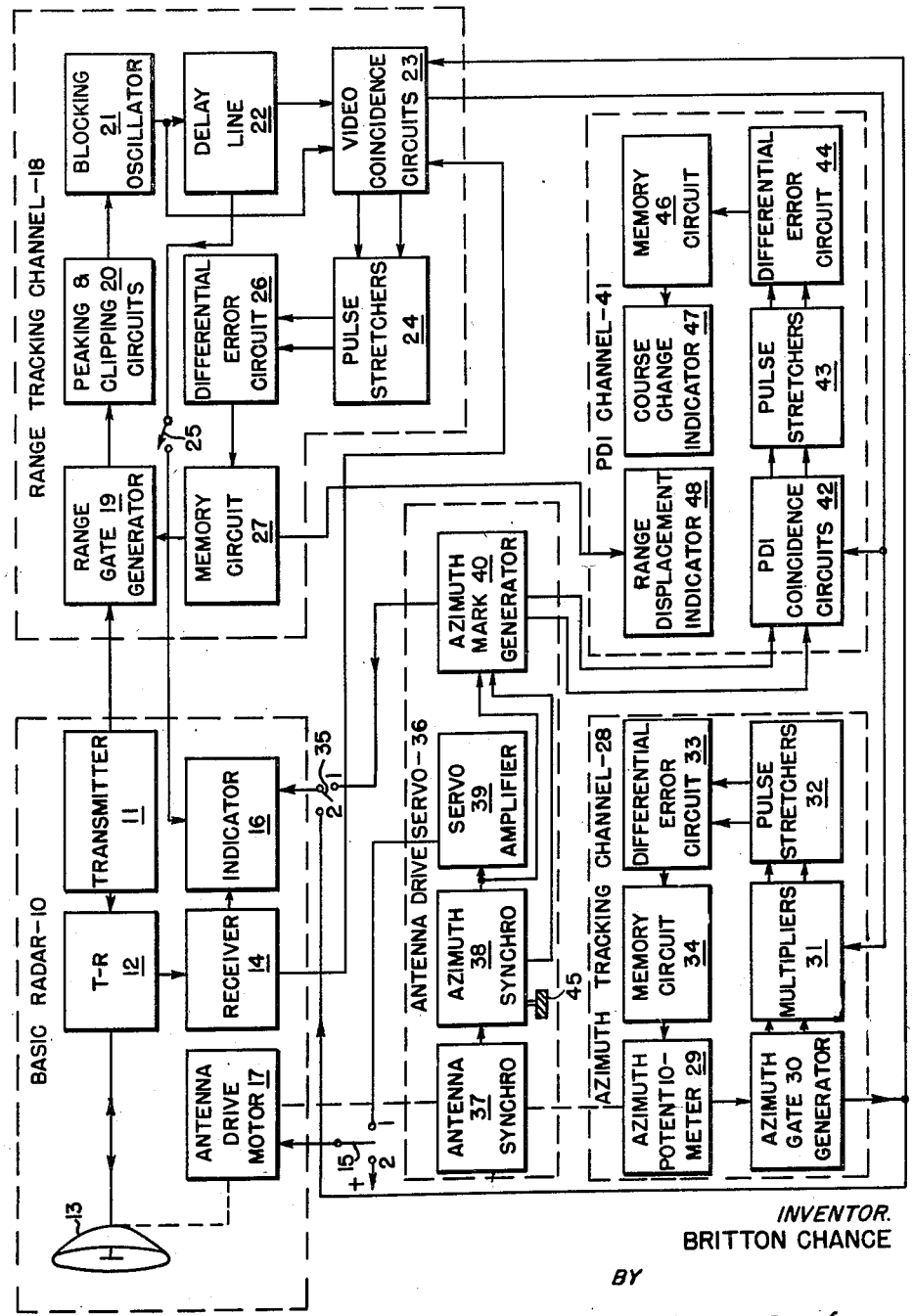
Fig. 2 is a block diagram of an apparatus embodying the principles of this invention.

Fig. 2 shows a system incorporating the principles of this invention. The entire system may be divided into the five component sections indicated by the dotted lines in Fig. 2. The basic radar 10 includes a transmitter 11, a transmit-receive switch 12, a directive antenna 13, a receiver 14, an indicator 16 and an antenna drive motor 17 in addition to interconnecting circuits. Range tracking channel 18 includes a range gate generator 19, peaking and clipping circuits 20, a blocking oscillator 21, a delay line 22, video coincidence circuits 23, pulse stretchers 24, differential error circuit 26 and a memory circuit 27. Azimuth tracking channel 28 includes an azimuth potentiometer 29, an azimuth gate generator 30, multipliers 31, pulse stretchers 32, a differential error circuit 33, and a memory circuit 34. Antenna drive servo 36 includes an antenna synchro 37, an azimuth synchro 38, a servo amplifier 39 and an azimuth mark generator 40 together with interconnecting circuits. P. D. I. channel 41 includes P. D. I. coincidence circuits 42, pulse stretchers 43, a differential error circuit 44, a memory circuit 46, course change indicator 47 and a range displacement indicator 48, together with associated connecting elements.

Transmitter 11 emits periodic pulses of radio frequency energy which are passed through transmit-receive (T-R) switch 12 to antenna 13 where said pulses are radiated into space in a directed beam. Reflected pulses from solid objects or transmitted reply pulses from beacons are returned to antenna 13 to be transmitted through T-R switch 12 to receiver 14. Receiver 14 amplifies and detects the received pulses and applies them to indicator 16 where they are made visible on a cathode ray tube screen. Indicator 16 may be of the P. P. I. type described above or of some similar convenient type. Antenna drive motor 17 causes azimuthal rotation of antenna 13, and may be connected by means of a single-pole double-throw switch 15 either to a source of direct voltage of constant magnitude or to the direct current output of servo amplifier 39, which may vary both in polarity and magnitude. Antenna drive motor 17 should be of a reversible type, so that its direction of rotation may be changed by changing the polarity of the voltage supplied to the motor through switch 15.

Transmitter 11 also produces voltage pulses synchronized with the transmitted pulses, and applies them as timing pulses to range gate generator 19. Range gate generator 19 may consist of any circuit capable of producing a periodic voltage pulse, the initial point of which coincides with a timing pulse from transmitter 11, and which has a duration proportional to the magnitude of a direct input voltage received from memory circuit 27. For example; a multivibrator might be employed in which the direct input voltage is applied as a bias to the grid of one of the vacuum tubes to control the output pulse duration. This periodic pulse or range gate of variable duration produced by range gate generator 19 is applied to peaking and clipping circuits 20. These latter circuits may consist of a resistance-capacitance peaker or differentiator circuit followed by a diode clipper, or of any other circuits capable of producing a series of sharp pulses coinciding with the terminations of the pulses from generator 19. Each of the voltage pulses from peaking and clipping circuits 20 is applied to blocking oscillator 21, the constitution and operation of which are well known in the art, to initiate or trigger a cycle of operation thereof and to produce a coincident pulse having considerably more energy. Since the trigger pulses applied to blocking oscillator 21 should be of positive polarity, the pulses from range gate generator 19 should be of negative polarity, or, if this is not the case, a stage of amplification may be inserted to invert the pulses.

The output from blocking oscillator 21 is applied both to delay line 22 and to video coincidence circuits 23. Delay line 22 may consist of a network of capacitive and inductive elements forming an approximation to an electrical transmission line having lumped constants, an arrangement well known in the art. The line should be terminated in an impedance approximately equal to its characteristic impedance, so that the delayed pulses have substantially the same shape as the undelayed pulses. The signal applied to delay line 22 is delayed thereby in an amount approximately equal to the duration of one of the pulses comprising said signal. The delayed pulses are also applied to video coincidence circuit 23. These undelayed and delayed pulses will be hereinafter referred to as the first and second range reference gates respectively. A partially delayed pulse from the mid-point of the line is applied to indicator 16 through single-pole single-throw switch 25 to produce a target range circle on the indicator screen.

Video coincidence circuit 23 consists essentially of two channels to which the first and second range reference gates are respectively applied. Video signals from receiver 14 and a positive voltage pulse or azimuth gate from azimuth gate generator 30, which occurs when antenna 13 is aimed at the chosen target, are applied to both channels in parallel. Each of the channels of the video coincidence circuit has an output only when all three of its input voltages are simultaneously present and the magnitude of this output varies directly as the magnitudes of these voltages. It is thus seen that the magnitude of the pulse output from each of the channels is a measure of the amount of coincidence between the video pulse and the range reference gate applied to that channel. The pulse outputs of the two channels are applied to pulse stretchers 24. A second output, which is a combination of the signals from the two channels, is applied to multipliers 31 and P. D. I. coincidence circuits 42. This output may be referred to as the gated video signal.

Pulse stretchers 24 operate in a manner to be described later to increase the energy content of the pulses and transmit them to a differential error circuit 26 which will also be hereinafter described in greater detail. Differential error circuit 26 compares the amplitudes of the two pulses supplied to it and transmits an output corresponding to the difference in amplitude to memory circuit 27. Memory circuit 27 produces a varying direct voltage, the magnitude of which is proportional to target range, for application to range gate generator 19, as mentioned previously. The characteristics of memory circuit 27 are such that the variation of this target range voltage continues at a uniform rate during that portion of the antenna scan cycle when pulses are not received from the target beacon. The range tracking channel which has just been described operates as a closed loop servo in such a manner as to cause continuous range tracking of the chosen target even though antenna 13 may be in continuous rotation.

Antenna drive motor 17 also rotates azimuth potentiometer 29 synchronously with the rotation of antenna 13. Azimuth potentiometer 29 is supplied with a direct voltage and thus produces a sawtooth voltage the frequency of which is equal to the antenna rotation frequency, and this voltage is applied to azimuth gate generator 30. The output of azimuth gate generator 30 comprises two opposing sawtooth voltages, one of which is inverted with respect to the sawtooth voltage produced by azimuth potentiometer 29, and also a rectangular voltage pulse or azimuth gate which occurs each time antenna 13 is aimed at the chosen target. Multipliers 31 consist essentially of two amplifier channels to which the opposing sawtooth voltages from azimuth gate generator 30 are respectively applied. The gated video signal from video coincidence circuits 23 is applied to both channels in parallel, and the operation is such that an output is obtained from a channel only when both signals are applied simultaneously to this channel. The magnitude of each output is governed by the magnitudes of the respective input voltages, and these outputs are applied to pulse stretchers 32.

Pulse stretchers 32, differential error circuit 33, and memory circuit 34 operate in a manner similar to that outlined above with reference to the corresponding circuits of range tracking channel 18, to produce a varying direct voltage proportional in magnitude to the target azimuth for application to azimuth potentiometer 29. The output from azimuth tracking channel 28, which has just been described, is the azimuth gate which is applied to video coincidence circuits 23, as well as through a single-pole double-throw switch 35 to indicator 16 to produce a target azimuth marker.

Antenna drive motor 17 also produces rotation of antenna synchro 37 at a speed equal to the antenna rotational speed. The rotor windings of antenna synchro 37 are excited by an alternating current source, not shown, and the stator terminals are connected to the stator terminals of azimuth synchro 38. The rotor of azimuth synchro 38 is adapted to be rotated manually by means of a knob 45. A voltage from a rotor winding of azimuth synchro 38 is applied to servo amplifier 39, the latter producing a direct voltage for application to antenna drive motor 17 through switch 15. Servo amplifier 39 may be of the type well known in the art which produces a direct output voltage the magnitude and polarity of which are respectively determined by the magnitude and phase of the alternating input voltage. A servo loop is thus formed, comprising antenna drive motor 17, antenna synchro 37, azimuth synchro 38 and servo amplifier 39, which operates in such a manner as to drive antenna 13 so that it maintains a position corresponding to the manually adjustable position of the rotor of azimuth synchro 38.

Azimuth mark generator 40 receives input voltages from azimuth synchro 38 and produces a voltage pulse when antenna 13 assumes an azimuth perpendicular to the aircraft ground track and in the direction of the target, said voltage pulse being applied when desired to indicator 16 through switch 35 to produce a perpendicular-to-ground-track marker on the indicator screen. Azimuth mark generator 40 also produces a pair of voltage pulses or azimuth reference gates when antenna 13 is in positions immediately adjacent to said predetermined direction. Azimuth mark generator 40 will be described in greater detail herein below.

The azimuth reference gates are applied to P. D. I. coincidence circuits 42, which also receive the gated video signal from video coincidence circuits 23. The P. D. I. coincidence circuits may closely resemble coincidence circuits 23 described above in that they comprise two channels. The azimuth reference gates are respectively applied to these two channels, while the gated video signal is applied in parallel to both channels. The output pulses from each of the two channels are of a magnitude determined by the amount of coincidence between the two input pulses applied to this channel. The output voltage pulses from P. D. I. coincidence circuits 42 are applied to pulse stretchers 43, differential error circuit 44 and memory circuit 46, all of which operate in the same manner as the corresponding components described with reference to range tracking channel 18. The output of memory circuit 46 is a direct voltage, the magnitude of which relative to a predetermined level is a measure of the magnitude and direction of heading error of the aircraft. The divergence of this voltage from the predetermined level is measured by course change indicator 47, which may be calibrated to read the heading error in degrees. Memory circuit 27 also applies a direct voltage proportional to the range to the chosen target to range displacement indicator 48. This direct voltage is compared with a second direct voltage proportional to the desired range from the first beacon. The amount of difference between these two voltages is indicated by the meter of indicator 48, which may be calibrated to read directly the lateral displacement of the aircraft from its desired circular course. Course change indicator 47 and range displacement indicator 48 will be described below with reference to Fig. 6.

Figure 3:
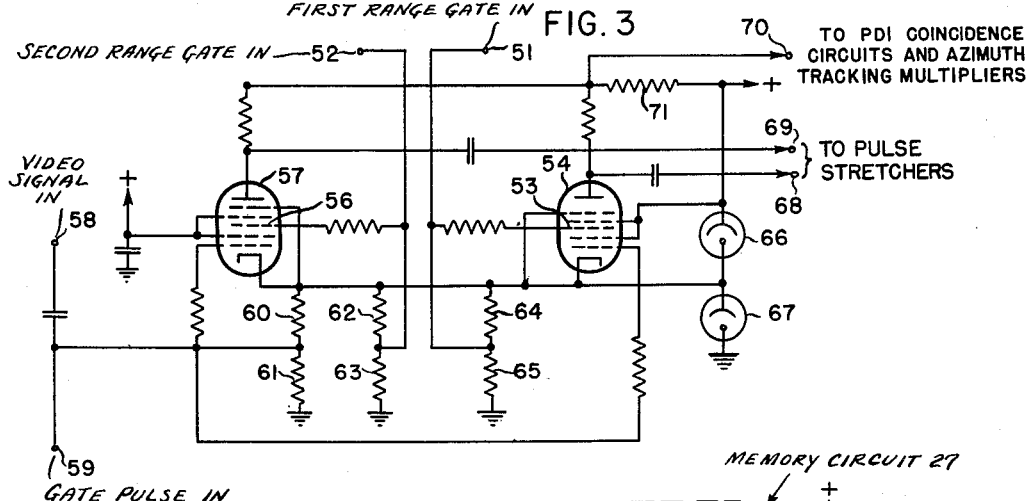
Fig. 3 is a schematic diagram of a coincidence circuit which may be used in the embodiment of this invention.

Reference is now made more particularly to Fig. 3 for a description of video coincidence circuits 23. The first range reference gate from blocking oscillator 21 is applied to terminal 51 while the second range reference gate from delay line 22 is applied to terminal 52. These pulses are transmitted to grid 53 of vacuum tube 54 and grid 56 of vacuum tube 57, respectively. Video signals from receiver 14 are applied through terminal 58 to the control grid of vacuum tubes 54 and 57, as are also gate pulses arriving from azimuth gate generator 30 through terminal 59. The direct potentials on the various grids of the two vacuum tubes are maintained at a proper level relative to the cathode by means of the voltage divider system comprising resistors 60, 61, 62, 63, 64 and 65 and voltage regulator tubes 66 and 67. These potentials are so chosen that vacuum tubes 54 and 57 will conduct current only when all three of the input voltages to each channel are simultaneously present. More particularly, terminal 68 will receive a pulse when a video signal from terminal 58 corresponding to the selected target, an azimuth gate pulse at terminal 59 and the first range reference gate pulse from terminal 51 are applied to vacuum tube 54. Similarly terminal 69 receives a pulse when the second range reference gate pulse at terminal 52 coincides at least partially with the video and azimuth gate pulses applied at terminals 58 and 59 respectively.

It will be obvious that the magnitudes of the pulses at terminals 68 and 69 will be equal only if the video pulse from terminal 58 occurs at a time exactly one-half way between that of the first and second range reference gate pulses arriving at terminals 51 and 52, and further that the difference between the magnitudes of the pulses at terminals 68 and 69 corresponds to the deviation of the video signal from the mid-position between the delayed and undelayed pulses. An output is produced at terminal 70 which is a combination of the outputs of the two channels due to load resistor 71, which is common to both vacuum tubes. This output is substantially a single pulse due mainly to the distributed capacitance of the circuit elements. Since this pulse is produced by the coincidence of the video signals with the range and azimuth gates, it occurs only when signals are received from the desired target and contains no other video signals. This then is the gated video signal applied to multipliers 31 and P. D. I. coincidence circuits 42. It will be obvious that with slight modifications to adapt it to receive two rather than three input voltages, the circuit of Fig. 3 may be used equally well for multipliers 31 and P. D. I. coincidence circuits 42.

Figure 4:
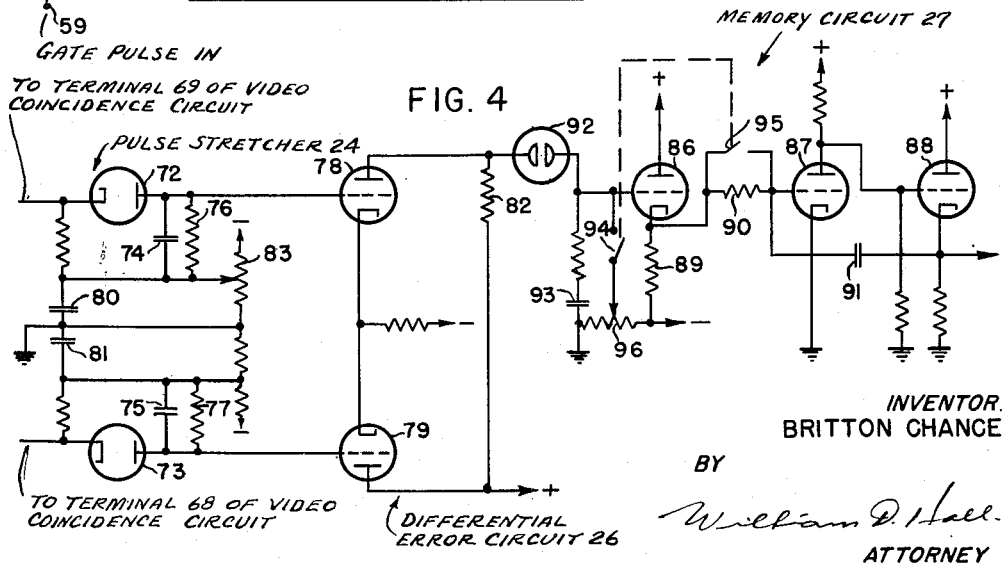
Fig. 4 is a schematic diagram of a pulse stretcher, error circuit, and memory circuit of a type which may be used in the present embodiment of this invention.

The pulses of negative polarity produced at terminals 68 and 69 of Fig. 3 are applied to pulse stretchers 24, a circuit diagram of one possible form of which is shown in Fig. 4, in conjunction with preferred embodiments of a differential error circuit, and a memory circuit. The pulses from terminal 69 are applied to the cathode of diode 72 while the pulses from terminal 68 are applied to the cathode of diode 73. These diodes conduct during the pulse, and charge capacitors 74 and 75 which then discharge slowly through resistors 76 and 77, respectively, after the termination of the pulses. Since the capacitors maintain their charge for some time after the termination of the pulses, the effect of the pulses is prolonged.

The voltage across capacitors 76 and 77 is applied to the grids of triodes 78 and 79, respectively, which, together with their associated circuits, form a differential error circuit, and to the cathodes of which is applied a negative potential. In order to maintain proper bias on the grids of these triodes, a negative potential is applied to them through resistors 76 and 77. To avoid biasing diodes 72 and 73, the same potential is applied to their cathodes. This requires employing capacitors 80 and 81, which prevent the incoming pulses from being transmitted to the diode anodes or plates. A positive potential is applied directly to the plate of triode 79, and through resistor 82 to the plate of triode 78. To adjust the relative operating points of triodes 78 and 79, the bias on the grid of triode 78 is made adjustable by means of potentiometer 83, thus permitting the output voltage at the plate of triode 78 to be adjusted to zero, when the input pulses to the two triodes are of equal amplitudes. It may be seen that, as the input pulses then become unequal, the potential at the plate of triode 78 will vary either above or below zero depending upon which input pulse has a greater amplitude.

Triodes 86, 87 and 88 and their associated circuits form a circuit of a type which may be employed for memory circuits 27, 34 and 46 of Fig. 2. The cathode of triode 86 is connected through resistor 89 to a source of negative potential, and also through resistor 90 to the grid of triode 87. Capacitor 91 is connected between the grid of triode 87 and the cathode of triode 88. It can be shown that capacitor 91 will be charged or discharged at a linear rate through resistor 90 when a potential is applied to the grid of triode 86. This rate of charge or discharge depends upon the magnitude and polarity of this incoming potential. Signals applied to the grid of triode 86 through neon tube 92 from the plate of triode 78 charge capacitor 93. When the incoming signals are interrupted, capacitor 93 maintains the grid of triode 86 at approximately the same potential until further signals are received. Because of the presence of neon tube 92, signals may not pass from the plate of triode 78 to the grid of triode 86 unless a sufficient difference of potential exists to render neon tube 92 conducting.

It may be desirable to use the voltage at the cathode of triode 88 as the direct current output voltage of the circuit. In this case, an initial voltage must be produced at this point by an initial charge placed on capacitor 91. For this purpose, ganged single-pole, single-throw switches 94 and 95 are closed, and potentiometer 96 is adjusted until a proper output voltage is obtained as judged by criteria to be explained later. Switch 95, when closed, allows capacitor 91 to charge rapidly, so as to speed the adjustment. When a proper output voltage has been attained, switches 94 and 95 are opened, and the output then varies as determined by difference signals from triode 78. A more complete explanation of the operation of a memory circuit of this type may be had by reference to the copending application by Britton Chance and Andrew A. Jacobsen, Serial No. 616,378, filed September 14, 1945. It will be apparent that the circuit arrangement just described, comprising pulse stretchers, differential error circuit and memory circuit, may be employed in the azimuth tracking channel and P. D. I. channel, as well as in the range tracking channel to accomplish similar results.

Fig. 5 shows one possible form for azimuth potentiometer 29 and azimuth gate generator 30. Azimuth potentiometer 29 is a linearly wound potentiometer having a continuously rotatable variable contact arm. This arm is rotated by a mechanical coupling to antenna drive motor 17 as explained above, so that when a positive direct voltage is applied across the potentiometer and the antenna is rotated, a periodic sawtooth voltage output is produced of a period equal to that of the antenna rotation. This output voltage is combined, by means of a resistance combination comprising resistors 101 and 102, with a direct voltage of varying magnitude from memory circuit 34, and the combination is applied to the grid of triode 103, which, together with triodes 104, 105, and 106 and associated circuit elements, form a type of azimuth gate generator. Resistors 101 and 102 should be large compared to the total resistance of potentiometer 29 for proper operation. The cathodes of triodes 103 and 104 are coupled together and have a common cathode resistor 107. The magnitude of the direct voltage from memory circuit 34 determines the direct current operating level of triode 103, and the output voltage at its plate is transmitted to one channel of multipliers 31, as well as to the grid of triode 106. The output wave form of triode 104 is the reverse of that of triode 103, because of the cathode coupling between the triodes, and this output is transmitted to the other channel of multipliers 31 and to the grid of triode 105. With no signal triodes 105 and 106 are in a cutoff condition, due to the positive bias supplied to their cathodes through resistor 108 and maintained constant by voltage regulator tube 109. Because of the opposing input signals, the two triodes are caused to conduct during different portions of the antenna scan cycle. If these input signals are of the proper magnitude, there will be a short intermediate portion of the cycle when neither triode conducts, and at this time the plate voltage rises sharply due to the common load resistor 110. This sharp rise constitutes the azimuth gate pulse applied to video coincidence circuit 23 and indicator 16. During this period, the instantaneous grid voltages on the triodes are passing through approximately the same value. The portion of the scan cycle during which both grid voltages are at a cutoff value depends upon the magnitude of the direct voltage applied through resistor 102, since a variation in this voltage causes the D.-C. level of one of the sawtooth voltages to rise while the other falls. By varying this voltage, the azimuth gate may be caused to occur at any point throughout the azimuth scan cycle. Potentiometer 111 in the grid circuit of triode 104 may be employed to adjust the relative direct current levels of triodes 103 and 104 to cause the azimuth gate to occur at a predetermined time during the azimuth scan cycle for a given direct current input from memory circuit 34. Multipliers 31, to which are applied the sawtooth voltages from triodes 103 and 104, may, as explained above, closely resemble the circuit of Fig. 3. Since these sawtooth voltages pass through equal instantaneous values during the occurrence of the azimuth gate, the video pulse from the target, which is applied to both channels of multipliers 31 should be multiplied by an equal factor in each channel, and the pulses applied from these channels to pulse stretchers 32 tend to be equal. If the instantaneous values of the sawtooth voltages are not exactly equal at the time the target video pulse is received, the difference in pulse magnitudes, as determined by differential error circuit 33, causes memory circuit 34 to apply a slightly different voltage to the grid of triode 103, and a balance is thereby attained. This azimuth tracking channel just described acts as a closed servo loop to cause continuous azimuth tracking, the function of memory circuit 34 being such as to maintain a constant tracking rate during the portion of the azimuth scan cycle in which the antenna is not receiving signals from the target.

Fig. 6 is a circuit diagram of one possible form of course change indicator 47 or range displacement indicator 48. The meter itself may be a voltmeter 112 connected between the cathodes of two triodes 113 and 114 connected as cathode followers. Meter 112 should be of the zero-center type arranged to deflect in either direction from the center scale zero position, depending upon the polarity of the voltage applied to it. Taking as an example the case of range displacement indicator 48, the variable direct voltage from memory circuit 27 is applied to the grid of triode 113. A second direct voltage from potentiometer 116 is applied to the grid of triode 114. The magnitude of this latter direct voltage is chosen to be proportional to the desired range to the target beacon being tracked, and the constant of proportionality is made the same as that between the actual beacon range and the range voltage from memory circuit 27. The magnitude and direction of the meter deflection then is proportional to the difference in the magnitudes of these direct voltages, and the meter may be calibrated to read the lateral displacement from the desired course directly in yards. Obviously in the case of course change indicator 47 the input voltage to triode 113 is obtained from memory circuit 46 and potentiometer 116 is set so that meter 112 reads zero when the output from differential error circuit 44 is zero.

Reference is now made more particularly to Fig. 7, which shows a circuit diagram of one embodiment of azimuth mark generator 49, together with antenna synchro 37 and azimuth synchro 38. The rotor of antenna synchro 37 includes two mutually perpendicular coils 117 and 118, and is mechanically driven in synchronism with antenna 13. By means of single-pole, double-throw switch 119, an alternating potential from alternating current source 120 may be applied to either coil 119 or coil 118. The three coils of stator 121 of antenna synchro 37 are respectively connected to the three coils of stator 122 of azimuth synchro 38. The rotor of azimuth synchro 38 includes two mutually perpendicular coils 123 and 124, and is adapted to be rotated manually by means of knob 45. The voltage induced in coil 124 is applied to servo amplifier 39 of Fig. 2 to form the servo loop described above in connection with antenna drive servo 36.

With switch 15 of Fig. 1 in the number 1 position antenna 13 may first be oriented in the direction of the ground track of the aircraft by turning knob 45. During this process, switch 119 of Fig. 7 is in its number 1 position so that coil 117 is energized. If now switch 15 is thrown to its number 2 position, antenna 13 will be rotated continuously, and the voltage induced in coil 124 will pass through a null each time the antenna is pointed in the direction of the ground track, or in a direction opposite thereto. If switch 119 is thrown to position 2, coil 118 will be energized and the nulls in the voltage induced in coil 124 will occur in positions perpendicular to the ground track. By means of transformer 126, a small additional alternating voltage of constant magnitude is added to the output of coil 124 and the resulting voltage is applied in push-pull to the grids of triodes 127, 128, 129 and 130 by means of transformers 131 and 132. The voltage applied to the primary of transformer 126 is obtained from alternating current source 135, which may be the same as alternating current source 120, or any source in phase therewith, and the turns-ratio of transformer 126 should be such that the voltage coupled into the secondary is rather small in comparison with the voltage from coil 124. This additional voltage has the effect of displacing the ocurrence of the null in the voltages applied to transformers 131 and 132 by a small interval from the time at which it occurs in coil 124. Since the voltage from coil 124 is applied to the center tap of the secondary of transformer 126, the nulls in the voltage applied to transformers 131 and 132 are displaced in opposite directions, but by equal amounts, from the null in voltage occurring in coil 124.

Triodes 127 and 128 serve as overdriven push-pull amplifiers, while triodes 133 and 134 act as push-pull plate detectors. The operation is such that a pulse is produced at the plates of triodes 133 and 134 each time a null occurs in the input voltage from transformer 131. The channel including triodes 129, 130, 135 and 136 operates in substantially the same manner as that just described to produce a similar series of pulses. These two groups of pulses are applied respectively to the grids of gated triodes 137 and 138.

It is obvious that nulls will occur not only when the antenna is in positions immediately adjacent to the perpendicular-to-ground-track position and directed toward the target, but also in positions differing from these by 180°. Pulses resulting from these latter nulls must be eliminated in order to use the output voltages of the two channels just described as azimuth reference gates. The voltage induced in rotor coil 123 of azimuth synchro 38 will have nulls occurring half way between those of the voltage induced in coil 124. By means of transformer 139, an alternating voltage of constant magnitude from source 135 is added in series with the voltage from coil 123, and the resulting voltage is then applied to the grid of triode 140. Transformer 139 should have such a turns-ratio that the magnitude of the added voltage is equal to the peak magnitude of the voltage from coil 123. The resulting voltage which is applied to the grid of triode 140 then has an amplitude variation of a period twice as great as that of the variation in amplitude of the voltage from coil 123. Further, one maximum in this grid voltage occurs simultaneously with every second maximum in the voltage induced in coil 124.

Triode 140 is biased beyond cutoff by a positive potential applied to its cathode by means of potentiometer 141. This potentiometer may be adjusted so that triode 140 conducts only on the most positive peaks of the input voltage, in other words, during the maxima. The output voltage of triode 140 is applied to the grid of triode 142, which has a cathode load resistor 143 and a filter capacitor 144. The time constant of this resistance-capacitance circuit is made large relative to the period of the alternating input voltage so that a substantially rectangular negative pulse is produced in the cathode of triode 142 each time a maximum occurs in the input voltage to triode 140. These negative rectangular pulses are applied to the cathodes of triodes 137 and 138 which are biased to cutoff in the absence of this signal by negative grid potentials. By this arrangement, only the desired pulses are passed by triodes 137 and 138, and these constitute the azimuth reference gates applied to P. D. I. coincidence circuits 42. The combined output voltage of these latter triodes, as developed across common load resistor 145, is substantially a single pulse, which may be applied to the indicator to form a perpendicular-to-ground-track marker. A more detailed description of the operation of an azimuth mark generator circuit of a type similar to that just discussed may be had by reference to the copending application by Amasa S. Bishop, Serial No. 598,157, filed June 7, 1945.

A typical operation of the system whose components and general nature have just been described might be as follows:

Let it first be assumed that the aircraft is in flight and that the various components of the basic radar 10 of Fig. 2 are in operation. When the aircraft approaches sufficiently close to the target beacon, the beacon signal will appear on the screen of the indicator. The aircraft may then approach the target beacon until a distance is reached which is approximately equal to the radius of the desired circular course about the beacon. With switch 15 in the number 1 position, a determination of ground track and drift angle may now be made as described previously by rotating antenna 13 by means of its servo connection to knob 45. With knob 45 now remaining set in a position corresponding to the ground track, switches 15 and 35 of Fig. 1 and switch 119 of Fig. 7 may be thrown to the number 2 position, and a perpendicular-to-ground-track marker will be produced on the indicator screen while the antenna rotates continuously. The heading of the aircraft may now be changed if necessary to cause the perpendicular-to-ground-track marker to intersect the beacon indication on the screen of the indicator. If any considerable change was made in the heading of the aircraft, a new determination of ground track may be necessary, since the drift angle may have been appreciably altered, and any further heading corrections may then be made. The aircraft now is approximately on course, and switch 25 may be closed while switch 35 is thrown to position 2 in order to adjust the system for automatic operation. A range circle produced by the pulses from the midpoint of delay line 22 and an azimuth mark produced by the azimuth gate pulse from generator 30 now appear on the screen. The direct output voltages of memory circuits 27 and 34 may now be adjusted to initiate automatic range and azimuth tracking. These voltages may be varied by the means described in connection with Fig. 4 until the range and azimuth marks coincide with the beacon indication on the screen. Range and azimuth tracking will now proceed as described in connection with the explanation of the various components of the system. Course change indicator 47 is adjusted for zero reading, as described previously, and the potentiometer of range displacement indicator 48 is adjusted according to the radius of the desired circular course. Indications of heading corrections and lateral displacements are now given continuously to the pilot by means of the indicators.

If a slight error occurs in the heading of the aircraft, error signals will be applied from differential error circuit 44 to memory circuit 46. During the portion of the antenna scan cycle when signals are not received from the target beacon, the error in aircraft heading will continue to increase, providing the aircraft travels a straight line course. The output of memory circuit 46 continues to change at a constant rate, as described previously, so that when the next group of signals is received from the target beacon, the error in heading is approximately the same as that indicated by course change indicator 47.

If the aircraft is to travel any considerable portion of the circular course before reaching the bomb release point, occasional redeterminations of drift angle should be made. During this time similar redeterminations may also be made to allow for possible changes in wind direction or velocity during the time the aircraft is traveling its prescribed course.

While there has been described what is at present considered to be the preferred embodiment of this invention, it will be obvious to those skilled in the art that various changes and modifications may be made therein without departing from the spirit and scope of the invention.

The invention claimed is:

1. A pilot's direction indicator system for use in an aircraft, said system including a directive antenna, means for effecting continuous azimuthal rotation of said antenna, means for determining a first direction perpendicular to the direction of travel of the aircraft relative to ground, means for producing first and second voltage pulses in response to said antenna being pointed in a direction differing by a given small amount from said first direction, means for producing a third voltage pulse in response to said antenna being directed toward a given point fixed in relation to the aircraft, means for comparing the degrees of coincidence between said third voltage pulse and said first and second voltage pulses respectively, and means for producing a visible indication of the amount of divergence of said third pulse from a condition of equal coincidence with said first and second pulses.

2. A pilot's direction indicator system for use in an aircraft, said system including a directive antenna, means for effecting continuous azimuthal rotation of said antenna, means for producing an azimuth marker corresponding to a first direction perpendicular to the direction of travel of the aircraft relative to ground, means for producing first and second voltage pulses in response to said antenna being pointed in a direction differing by a given small amount from said first direction, means for producing a third voltage pulse in response to said antenna being directed toward a given point fixed in relation to the aircraft, means for comparing the degrees of coincidence between said third voltage pulse and said first and second voltage pulses respectively, and means for producing an indication of the amount of divergence of said third pulse from a condition of equal coincidence with said first and second pulses.

3. A pilot's direction indicating system including means for producing a first direct voltage the magnitude of which is continuously proportional to the range of a fixed point from a moving aircraft, means for producing a second direct voltage the magnitude of which is proportional to a predetermined desired range of said fixed point from said aircraft, means for comparing the relative magnitudes of said first and second direct voltages, means for producing an azimuth marker corresponding to the direction perpendicular to the direction of travel of the aircraft relative to ground, means for continually comparing the azimuth of said fixed point relative to said aircraft with said direction perpendicular to said direction of travel relative to ground, and means for providing an indication of the information derived from this comparison process.

4. A pilot's direction indicating system including means for producing a first direct voltage the magnitude of which is continuously proportional to the range of a fixed point from a moving aircraft, means for producing a second direct voltage the magnitude of which is proportional to a predetermined desired range of said fixed point from said aircraft, means for comparing the relative magnitudes of said first and second direct voltages, means for producing an azimuthal indication of the direction perpendicular to the direction of travel of the aircraft relative to ground, and means for continually comparing the azimuth of said fixed point relative to said aircraft with said direction perpendicular to said direction of travel relative to ground.

5. A system for enabling a pilot of an aircraft to direct it on a circular course about a fixed ground point, comprising a radiant electro-magnetic energy scanner having an antenna, additional means calibrated in units of angle for directly indicating lateral displacement of the aircraft from said circular course, means for indicating the angular divergence of the heading of the aircraft from the direction of said circular course, and means for keying into operation said two first-named means in response to the antenna of said scanner being pointed in the direction of a predetermined target.

6. A system according to claim 2, further including means for producing a first direct voltage the magnitude of which is continuously proportional to the range of said given point to the moving aircraft, means for producing a second direct voltage the magnitude of which is proportional to a predetermined desired range of said given point from said aircraft, and means for continually comparing the azimuth of said given point relative to the aircraft with said direction perpendicular to said direction of travel relative to ground.

7. A direction indicating system for a pilot on an aircraft, comprising a radio object locating apparatus including an indicator, an azimuth scanning antenna for said apparatus; means for producing on said indicator a marker corresponding to a rotary direction of said antenna which is perpendicular to the direction of travel of the aircraft in motion relative to ground, including means for adjusting the rotary position of said antenna, means supplied from said apparatus for generating a signal voltage continuously proportional to the range of a given fixed point, means for comparing said signal range signal to a signal representing a predetermined desired range of said given point and for indicating the difference therebetween; means controlled from said apparatus for generating a signal corresponding to the azimuth of said antenna, means for supplying a keying signal controlled by said scanning antenna and by signals from said apparatus in response to the antenna being directed toward said given point, said keying signal being supplied to said indicator and to said range signal generating means as an azimuth gate; means for comparing the azimuth of signals from said apparatus corresponding to said given point controlled by said azimuth gate with said marker which is perpendicular to the direction of travel relative to ground and for indicating the difference in degrees therebetween.

BRITTON CHANCE.

REFERENCES CITED

The following references are of record in the file of this patent:

UNITED STATES PATENTS

| Number | Name | Date |
|---|---|---|
| 2,223,224 | Newhouse | Nov. 26, 1940 |
| 2,396,112 | Morgan | Mar. 5, 1946 |
| 2,403,622 | Tuska | July 9, 1946 |
| 2,403,625 | Wolff | July 9, 1946 |
| 2,405,930 | Goldberg | Aug. 13, 1946 |
| 2,418,143 | Stodola | Apr. 1, 1947 |
| 2,429,595 | Abraham | Oct. 28, 1947 |
| 2,508,565 | Chance | May 23, 1950 |